United States Patent [19]

Saner

[11] 4,240,289
[45] Dec. 23, 1980

[54] MASS AND FORCE METER

[75] Inventor: Kaspar Saner, Dübendorf, Switzerland

[73] Assignee: Wirth Gallo & Co., Zurich, Switzerland

[21] Appl. No.: 969,542

[22] Filed: Dec. 14, 1978

[30] Foreign Application Priority Data

Feb. 2, 1978 [CH] Switzerland ............... 1573/78

[51] Int. Cl.³ .................... G01L 1/04; G01L 1/10
[52] U.S. Cl. ........................ 73/141 R; 73/141 A; 73/141 AB; 73/DIG. 1
[58] Field of Search ........... 73/141 A, 141 R, 141 AB, 73/DIG. 1

[56] References Cited

U.S. PATENT DOCUMENTS

| | | | |
|---|---|---|---|
| 2,458,481 | 1/1949 | Ruge | 73/141 A |
| 2,767,974 | 10/1956 | Ballard et al. | 73/DIG. 10 |
| 2,877,646 | 3/1959 | Dudenhausen | 73/141 A |
| 3,237,450 | 3/1966 | Brooks, Jr. | 73/141 A |

FOREIGN PATENT DOCUMENTS 2437058 2/1976 Fed. Rep. of Germany ..... 73/141 AB

Primary Examiner—Charles A. Ruehl
Attorney, Agent, or Firm—Stevens, Davis, Miller & Mosher

[57] ABSTRACT

A mass and force meter comprising, a frame, a load support connected to said frame; a measuring system comprising two dynamometers, a reference base and a force input; a load spring mounted between said frame and said load support, and a measuring spring mounted between said load support and said force input, said load spring being at least ten times stronger than said measuring spring, said load spring and said measuring spring eliminating partly or completely force-reducing lever systems in mass meters and allowing, if required, the linearization of non-linear characteristics of several components of the meter.

6 Claims, 9 Drawing Figures

MASS AND FORCE METER

The invention relates to a mass and force meter having a frame, a load support, a reference base and a measuring system comprising a force input and two dynamometers, e.g. a scale with vibrating strings. The reference base can be the weight of a reference mass of the force of a reference spring.

Meters of this kind are well known. They can be divided into two groups: In the first group, the weight of a reference mass acts upon one of the dynamometers, the weight of the mass or the force to be measured acts upon the second dynamometer, there is no coupling of these dynamometers. In most cases two identical or at least similar dynamometers are used. The assessment of the mass or force to be measured is made by comparing the electrical outputs of the dynamometers, so that the dependence upon the local value of the earth acceleration is eliminated. The use of identical or at least similar dynamometers allows elimination of the direct or indirect effects of temperature variations like longitudinal expansion or changes of the elastic properties. Strain gauges, vibrating quartz, and vibrating strings can be used as dynamometers.

In the second group of meters the reference base and the load both act on both dynamometers but with different ratios. Relations which are naturally not linear, as for instance the relation between the tension and the frequency of a vibrating string, can be made linear in some cases.

Depending upon the kind of dynamometer used, the actual force acting directly upon a dynamometer, called the measuring force, must be within a precise range of values. If this condition is not satisfied, the required resolution would not be achieved, or more resistant, i.e. more expensive, dynamometers have to be used. It is for this reason that most dynamometers are loaded by a measuring force transmitted by means of reducing lever or wire systems.

If the forces to be measured are much larger than the measuring force, as is the case with vehicle scales or crane scales, then these lever systems become extremely expensive, also because of the required resistance, they cannot be built compactly enough. Also some of the linearizing tasks, which must be solved depending on the kind of dynamometers used, can be solved only partly with lever systems and only under additional conditions.

It is an object of the invention to create means eliminating partly or completely force-reducing lever systems and allowing, if required, the linearization of non-linear characteristics of several functions.

It is another object of the invention to provide a scale in which a load spring is mounted between the load support and the frame and a weaker measuring spring is mounted between the load support and the force input of the frame-based measuring system.

Embodiments of the invention are represented schematically in the enclosed drawings.

FIGS. 1, 2 each show an embodiment with non-coupled dynamometers,

FIGS 3, 4, 5 each show an embodiment with coupled dynamometers,

Figure 1:
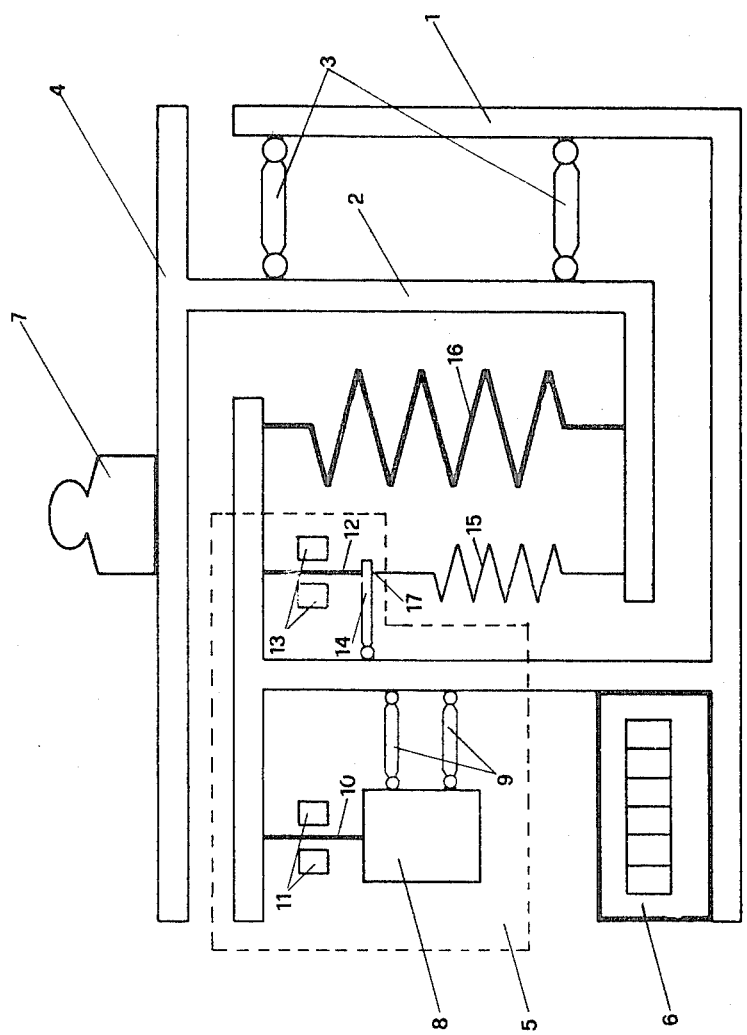

The first embodiment shown in FIG. 1 has a frame 1 and a load support 2 linked to frame 1 by means of two guides 3 forming a so-called parallel guidance. A platform 4 is fixed to load support 2. The dotted line shows the measuring system 5 which is connected to a computing and display unit 6. The measuring system compares the weight of a mass 7 to be measured with the weight of a reference mass 8 which is fixed to frame 1 by means of two guides 9 guiding it in a parallel way, said mass 8 loading a vibrating string 10 fixed to frame 1. String 10 is excited by a head 11 so as to vibrate transversely with constant frequency. A second vibrating string 12 is fixed to frame 1 and is excited by a head 13. The lower end of string 12 is guided by a guide 14 and connected to a measuring spring 15, the lower end of which is fixed to load support 2. The point where this spring 15 acts upon guide 14 is called the force-input point 17 of measuring system 5. A load spring 16 is fixed between frame 1 and load support 2. Both springs 15, 16 are helical springs with a linear force-extension-ratio.

When mass 7 exerts a force Ft on platform 4:

$$Ft = F1 + F2 \tag{1}$$

$$s = \frac{Ft}{k1 + k2} \tag{2}$$

where:
F1 = the force loading spring 15
F2 = the force loading spring 16
k1 = the spring rate of spring 15
k2 = the spring rate of spring 16
s = the extension of both springs under forces F1, F2 respectively.

The force exerted by spring 15 on string 12 at point 17 is:

$$F1 = sk1$$

If (1) and (2) are introduced in (3), this force is:

$$F1 = Ft \cdot \left(\frac{k1}{k1 + k2}\right) \tag{4}$$

As equation (4) shows, the measuring force acting upon string 12 is proportional to force Ft and its actual magnitude can be chosen by proper selection of k1 and k2. A simple calculation shows that the relation expressed by equation (4) is temperature-independent for the temperatue ranges in which scales are operated, provided both springs 15, 16 are made from the same material.

In FIG. 1 all electrical connections between computing and display unit 6 and strings 10, 12 are not shown.

Figure 2:
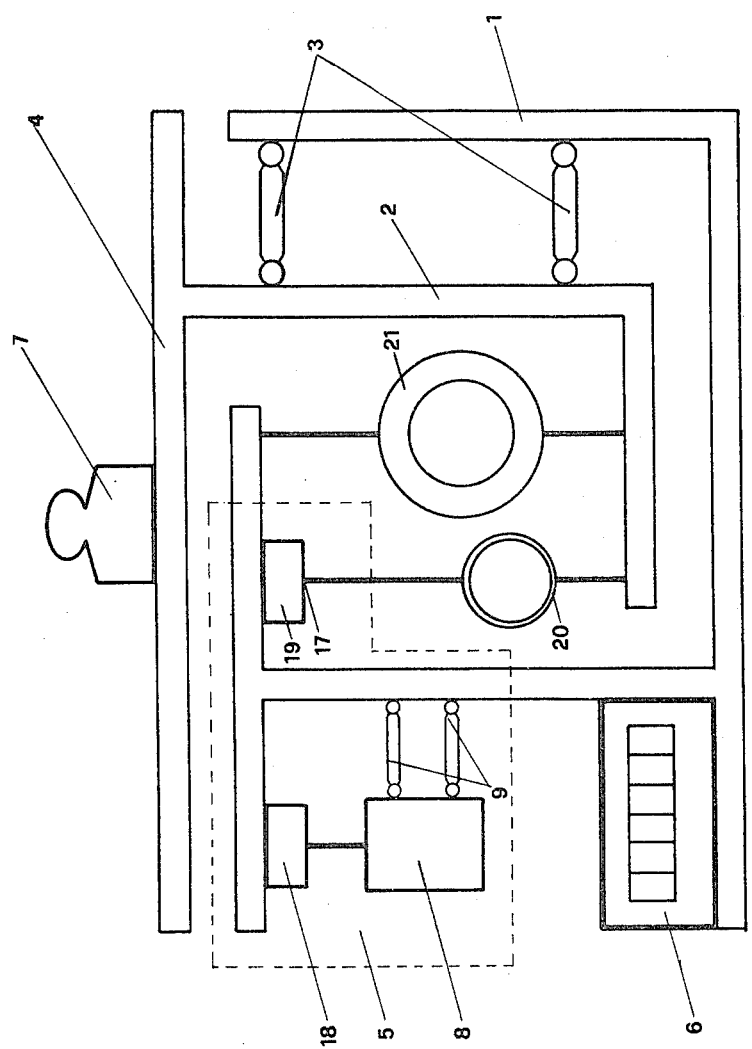

In FIG. 2 a second embodiment is shown which differs from that of FIG. 1 in that strings 10, 12 are replaced by strain gauges 18, 19 and in that springs 20, 21 are no more helical springs but are annular springs. Under the action of mass 7 these annular springs 20, 21 are loaded so that they change their shape and load support 2 moves downwards. Simultaneously measuring spring 20 exerts a force, i.e. the measuring force, on force input 17. The characteristic of such annular springs is not linear: when the load increases, they become harder. By proper selection of the characteristics of springs 20, 21, a non-linear behaviour of measuring system 5 can be compensated.

Figure 3:
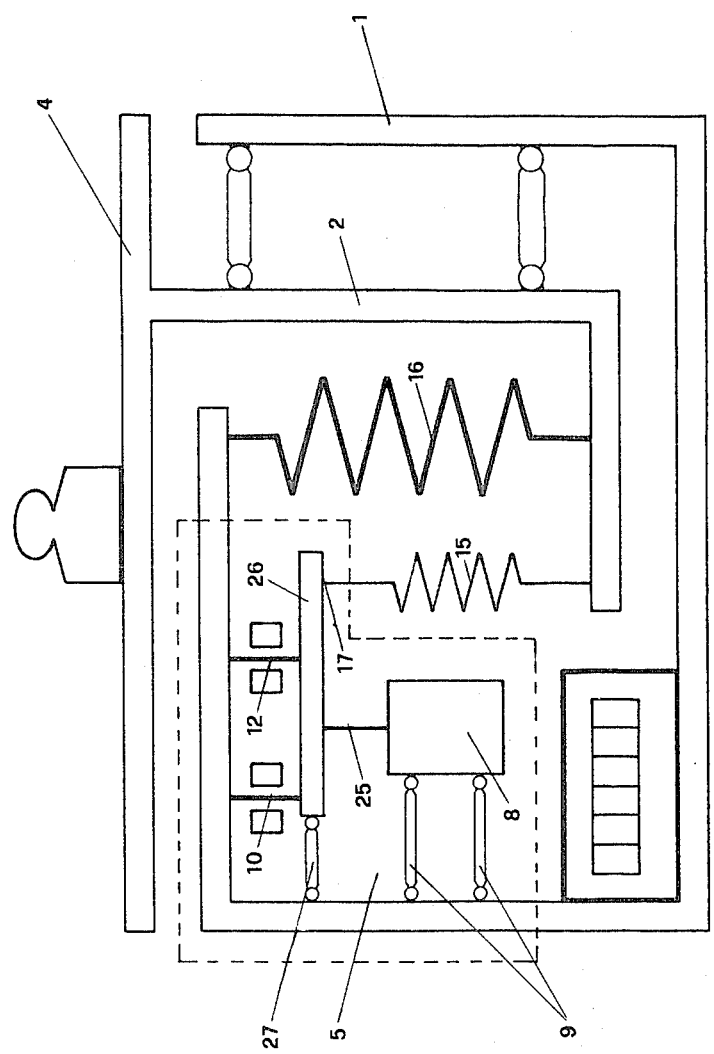

FIG. 3 shows a third embodiment corresponding to that of FIG. 1, however with a different measuring system 5. Both vibrating strings 10, 12 have their lower ends fixed to a force distributor 26 guided horizontally by a guide 27. Reference mass 8 is connected by means of a traction band 25 to force distributor 26. Traction band 25 is fixed to force distributor 26 at a point equidistant from the lower ends of strings 10, 12. The weight of reference mass 8 generates therefore the same pre-tension for each string 10, 12. Force input 17 is asymmetrical with respect to strings 10, 12 so that the measuring force increases the load on string 12 but decreases that on string 10. In computing and display unit 6 the oscillations of string 12 are counted during a pre-determined number of oscillations of string 10, out of this count the magnitude of mass 7 is computed and then displayed.

Figure 4:
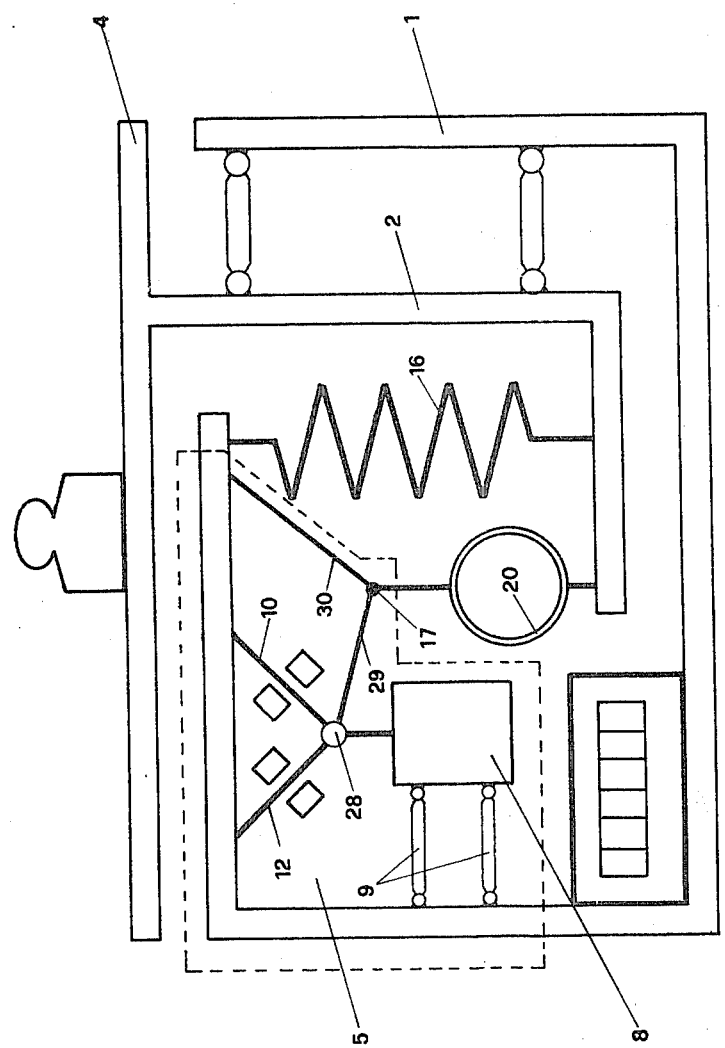

In the embodiment of FIG. 4 load spring 16 is a helical spring and measuring spring 20 is an annular spring. Strings 10, 12 are joined in V-form in well known manner. Their lower ends are fixed to a fastening head 28 on which the weight of reference mass 8 acts along the line bisecting the angle formed by strings 10, 12. As a result both strings are under the same pre-tension. Force input 17 is part of a wire system 29, 30. The measuring force acting upon force input 17 is reduced by this wire system 29, 30 before acting upon fastening head 28. The force acting upon strings 10, 12 increases the load on string 12 and decreases that on string 10. By displacing the ends of the wires forming the wire system 28, 29 the amount of reduction of the measuring force can be set at will. The measuring system 5 according to this embodiment is not strictly linear. The remaining amount of non-linearity can be compensated thanks to annular measuring spring 20.

Figure 5:
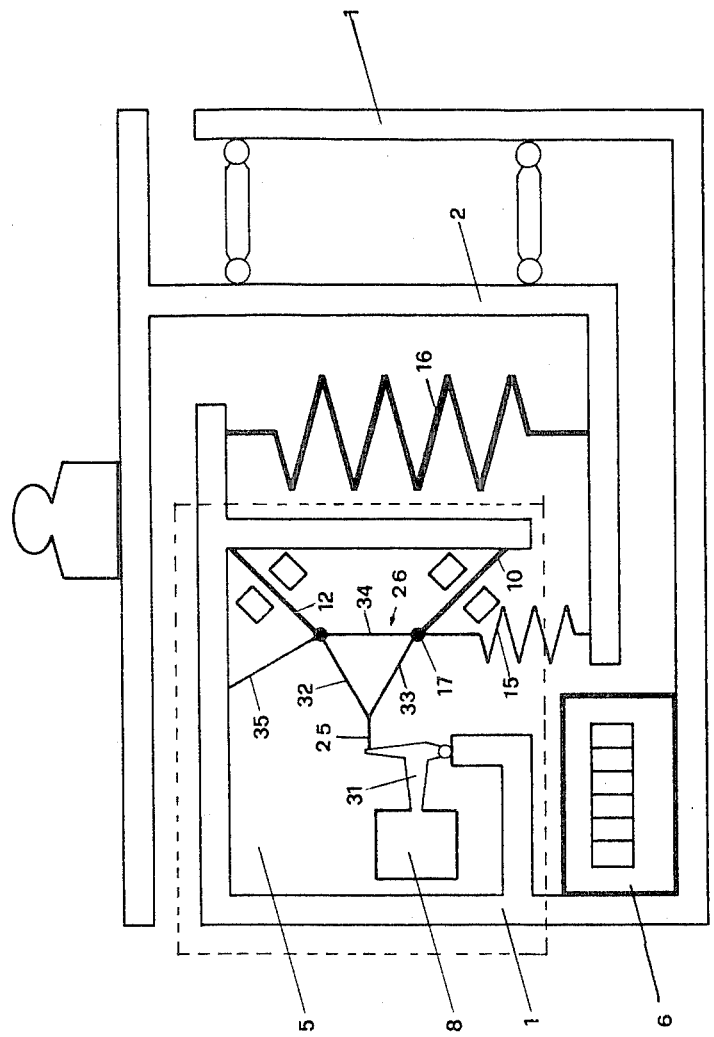

In the embodiment of FIG. 5 both the load spring 16 and the measuring spring 15 are helical springs. Strings 10, 12 are mounted in V-form and connected separately to a triangular force distributor 26 formed by traction bands 32, 33 and 34. At one corner of force distributor 26 a guide 35 is fixed, the other end of which is fixed to frame 1. Reference mass 8 is fixed to the horizontal arm of a two-arm lever 31 rotatably mounted on frame 1. The vertical arm of lever 31 is connected to force distributor 26 by means of a traction band 25.

Figure 6:
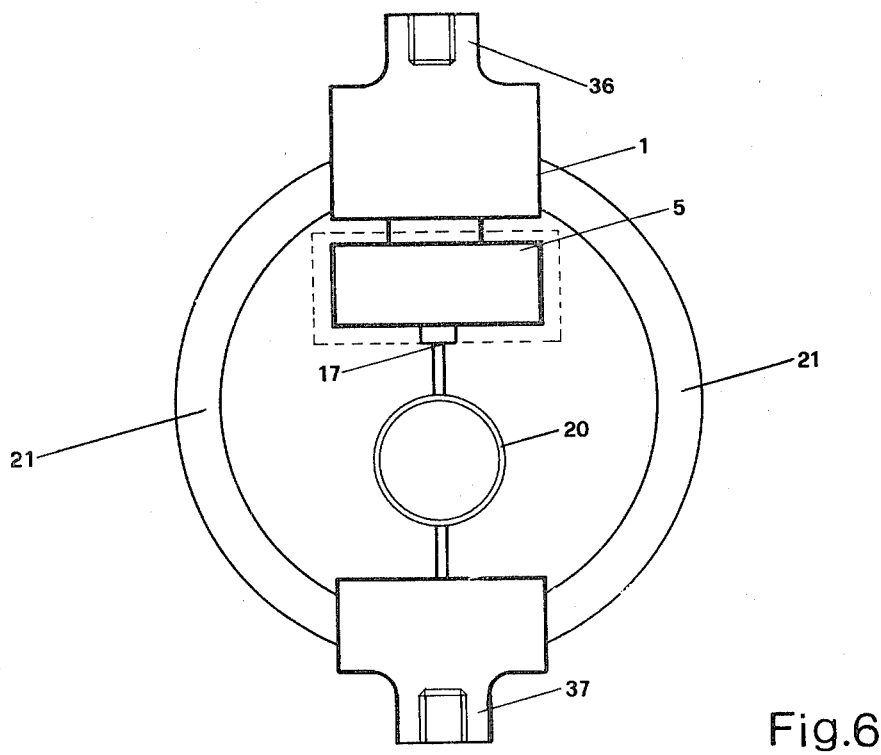
FIG. 6 shows an embodiment suitable for measuring tractions.

The embodiment of FIG. 6 is particularly suitable for suspended loads, i.e. for loads exerting a traction. Measuring system 5 is fixed to a fastening device 36, which in turn is fixed to a frame (not represented). The load support is formed by a fastening device 37 to which the load to be measured can be affixed. Load spring 21 serves for the suspension and the guidance of fastening device 37 which has the function of a load support. Measuring spring 20 is mounted between fastening device 37 and measuring system 5. Springs 20, 21 are both annular springs.

Figure 7:
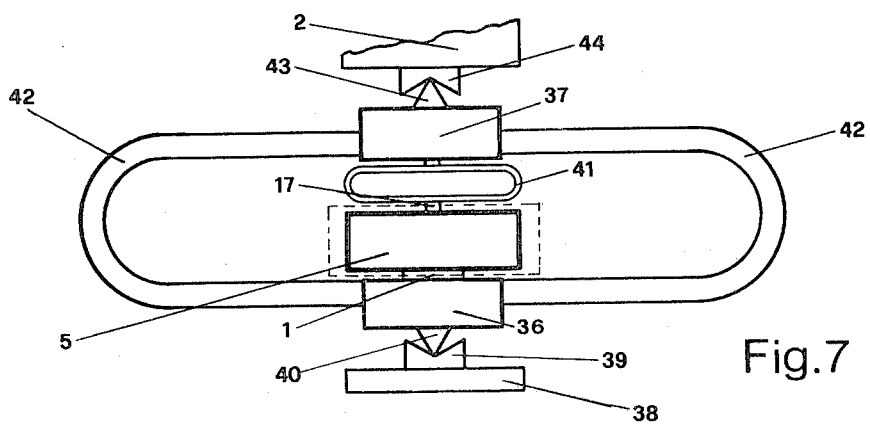
FIG. 7 shows an embodiment suitable for large loads.
Figure 8:
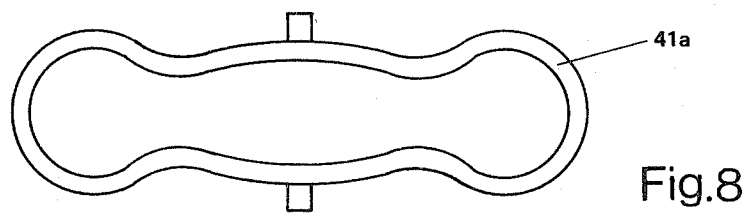
FIG. 8 is a variant to FIG. 7.

The embodiment of FIG. 7 is suitable for measuring a very large load exerting a compression force on the measuring system. A schematically represented ground plate 38 corresponds to the frame, it has a socket 39 in which a knife 40 projects, which is fixed to fastening device 36. The schematically represented load support 2 has a socket 44 in which a knife 43 projects, which is fixed to fastening device 37. Both the measuring spring 41 and the load spring 42 comprise a flattened annular spring. Also in this embodiment, load support 2 is guided by load spring 42. In FIG. 8 a variant of implementation of the measuring spring 41a is shown. It comprises two C-parts and two curved parts directed against the direction of action of the forces involved. By proper selection of the curvature of these parts, the characteristics of the measuring spring 41a can be determined so as to compensate for the non-linearity of the measuring system.

Figure 9:
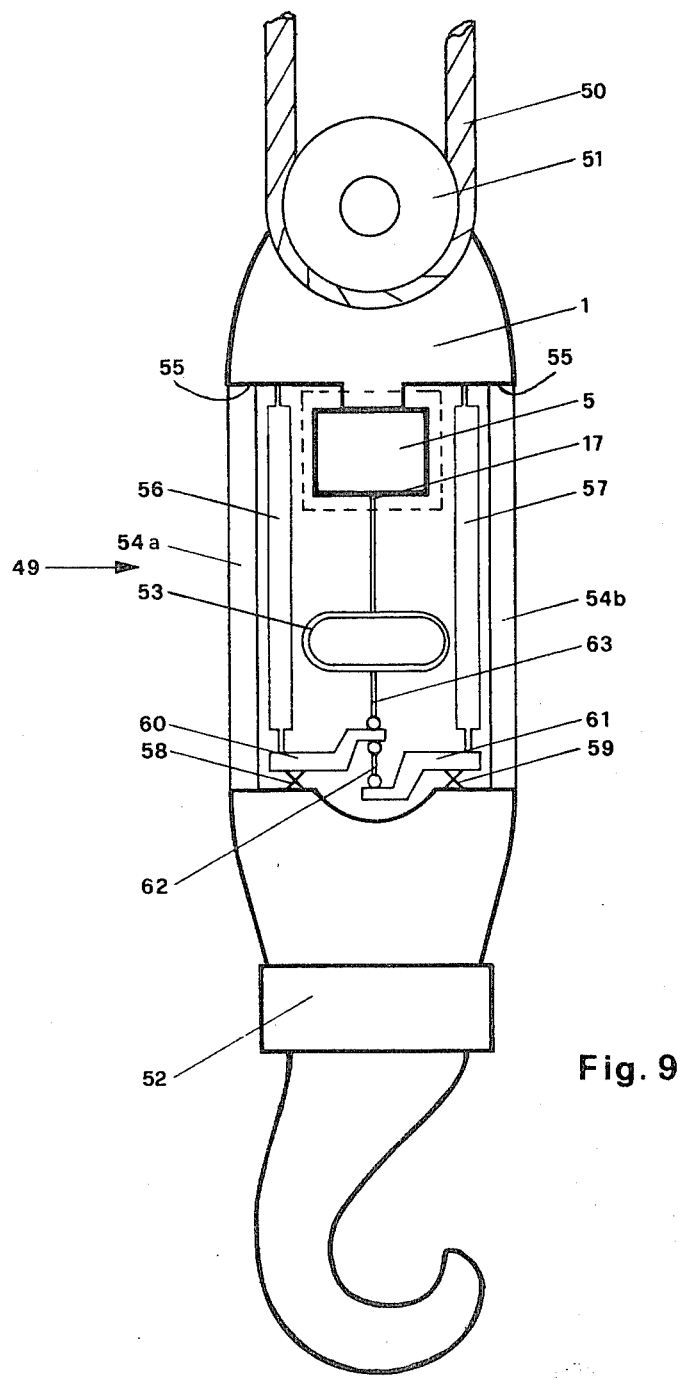
FIG. 9 is an embodiment used as a crane scale.

The embodiment according to FIG. 9 represents schematically a crane scale 49. Frame 1 has a pulley 51 by means of which the whole crane scale 49 is suspended to a rope or cable 50. The load support comprises a crane hook 52. The load spring is formed by two hard-elastic traction bars 54a, 54b fixed to frame 1 and crane hook 52. Measuring system 5 is fixed to frame 1. The latter has a shoulder 55. On the upper surface of crane hook 52 two levers 60, 61 are rotatably mounted in 58 and 59 respectively. Two rods 56, 57 are mounted between shoulder 55 and one of the ends of levers 60, 61. The ends of the longer arms of these levers 60, 61 are connected to each other by means of an articulated small rod 62. A traction band 63 connects the end of the longer arm of lever 60 to measuring spring 53 which is also connected to force input 17 of measuring system 5.

When crane hook 52 is loaded, two-part load spring 54a, 54b is submitted to a traction and the corresponding movement of crane hook 52 is amplified and transmitted to measuring spring 53 by means of levers 60, 61 acting as a multiplier, rods 56, 57 and band 63. Measuring spring 53 then generates a force acting upon force input 17.

In all embodiments of the invention the load spring should be preferably at least 10 times stronger than the measuring spring. However, it could be up to 10,000 times stronger.

In the embodiment the pre-tension for one or both dynamometers is generated by the weight of a reference mass, the latter could be replaced in well known manner by the force of a reference spring.

The movement of the load support under the action of the load to be measured, mass or force, is very small. It is within 0.01 mm to 1 mm at most.

I claim:
1. A mass and force meter comprising a frame; a load support; a measuring system comprising a first and a second dynamometer, and a reference mass; a load spring fixed to said frame and to said load support, said first dynamometer being fixed to said frame, said reference mass being fixed to said first dynamometer, said second dynamometer being fixed to said frame; and a measuring spring fixed to said second dynamometer and to said load support, said measuring spring being weaker than said load spring.

2. A mass and force meter comprising, a frame; a load support; a measuring system comprising a first and a second dynamometer, and a reference mass; a load spring fixed to said frame and to said load support, said first dynamometer being fixed to said frame, said reference mass being fixed to said first dynamometer, said second dynamometer being fixed to said frame; and, a measuring spring fixed to said second dynamometer and to said load support, said measuring spring being weaker than said load spring, said first and second dynamometers each consisting of a transversely vibrating string.

3. A mass and force meter comprising, a frame; a load support; a measuring system comprising a first and a second dynamometer consisting each of a strain gauge, and a reference mass; a load spring fixed to said frame and to said load support, said first dynamometer being fixed to said frame, said reference mass being fixed to said first dynamometer, said second dynamometer being fixed to said frame; and a measuring spring fixed to said second dynamometer and to said load support, said measuring spring being weaker than said load spring, said load spring and said measuring spring each consisting of an annular spring.

4. A mass and force meter comprising, a frame; a load support; a measuring system comprising a first and a second dynamometer, each consisting of a transversely vibrating string, and a reference mass; a load spring fixed to said frame and to said load support; a force distributor; said first and said second dynamometers being fixed to said frame, said force distributor being fixed to said first and second dynamometers, said reference mass being fixed to said force distributor; and, a measuring spring fixed to said force distributor and to said load support, said measuring spring being weaker than said load spring.

5. A mass and force meter comprising, a frame; a load support; a measuring system comprising a first and a second dynamometer, each consisting of a transversely vibrating string, and a reference mass; a helical load spring fixed to said frame and to said load support; a force distributor; a fastening head; said first and said second dynamometers being fixed to said frame and to said fastening head, said reference mass also being fixed to said fastening head, said force distributor consisting of a wire system fixed to said frame and to said fastening head; and, an annular measuring spring fixed to said force distributor and to said load support, said measuring spring being weaker than said load spring.

6. A mass and force meter comprising, a frame; a load support; a measuring system comprising a first and a second dynamometer, each consisting of a transversely vibrating string, and a reference mass; a load spring fixed to said frame and to said load support; a force distributor consisting of a wire system; said first and said second dynamometers being fixed to said frame, said force distributor being fixed to said first and second dynamometers, said reference mass acting on said force distributor; and, a helical measuring spring fixed to said force distributor and to said load support, said measuring spring being weaker than said load spring.

* * * * *